(12) United States Patent
Mathews et al.

(10) Patent No.: US 8,997,137 B2
(45) Date of Patent: Mar. 31, 2015

(54) STREAM CONTROL WITH DIFFERENT TRICK-MODE PROTOCOLS

(75) Inventors: Robin Montague Mathews, Westford, MA (US); Michael P. Ruffini, Methuen, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/327,966

(22) Filed: Dec. 16, 2011

(65) Prior Publication Data

US 2013/0160044 A1 Jun. 20, 2013

(51) Int. Cl.
*H04N 21/2343* (2011.01)
*H04N 21/6587* (2011.01)

(52) U.S. Cl.
CPC ......... *H04N 21/234309* (2013.01); *H04N 21/234381* (2013.01); *H04N 21/6587* (2013.01)
USPC ............ 725/31; 725/81; 725/94; 725/131; 725/110; 725/91; 725/88; 725/87

(58) Field of Classification Search
USPC ............ 725/131, 81, 110, 1, 88; 370/401; 709/231; 380/239
See application file for complete search history.

(56) References Cited

U.S. PATENT DOCUMENTS

| | | | |
|---|---|---|---|
| 6,543,053 B1* | 4/2003 | Li et al. | 725/88 |
| 2005/0129233 A1* | 6/2005 | Pedlow, Jr. | 380/239 |
| 2006/0007960 A1* | 1/2006 | Liu et al. | 370/503 |
| 2008/0134258 A1* | 6/2008 | Goose et al. | 725/91 |
| 2009/0252176 A1* | 10/2009 | Morita et al. | 370/401 |
| 2010/0198979 A1* | 8/2010 | Pickens et al. | 709/231 |
| 2010/0325672 A1* | 12/2010 | Barnett et al. | 725/81 |
| 2011/0055864 A1* | 3/2011 | Shah et al. | 725/31 |
| 2011/0061086 A1* | 3/2011 | Huang | 725/110 |
| 2011/0202945 A1* | 8/2011 | Pickelsimer et al. | 725/1 |
| 2011/0286721 A1* | 11/2011 | Craner | 386/343 |
| 2012/0011557 A1* | 1/2012 | Mathews et al. | 725/131 |
| 2012/0028567 A1* | 2/2012 | Marko | 455/3.02 |
| 2012/0246689 A1* | 9/2012 | Thomas et al. | 725/94 |

* cited by examiner

*Primary Examiner* — Nasser Goodarzi
*Assistant Examiner* — Tariq Gbond

(57) ABSTRACT

Embodiments disclosed include a method and a system. The method includes receiving a first media stream, in a first network device from a remote network device, using a first network protocol. The may method include converting the first media stream in real-time to a second media stream according to a second network protocol and transmitting the second media stream to a user device. The method may include receiving a first trick-mode command according to a first trick-mode protocol from the user device, wherein the first trick-mode command includes rewind, fast forward, or pause. The method may include converting the first trick-mode command into a second trick-mode command according to a second trick-mode protocol and transmitting the second trick-mode command to the remote network device.

16 Claims, 9 Drawing Sheets

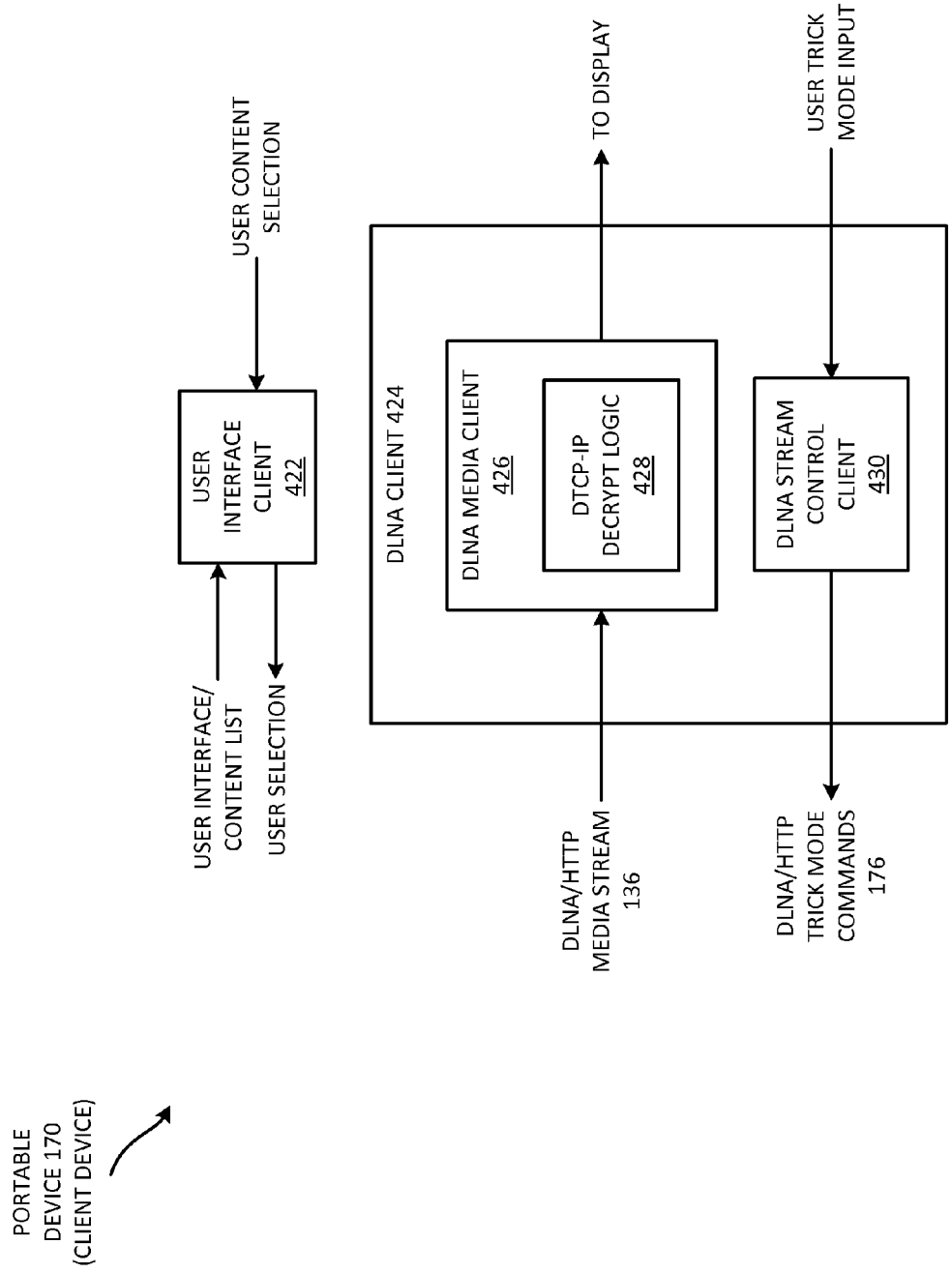

US 8,997,137 B2

STREAM CONTROL WITH DIFFERENT TRICK-MODE PROTOCOLS

BACKGROUND INFORMATION

Network, cable television, and satellite television providers often have Video on Demand (VOD) systems that allow users to select, watch, and listen to video or audio content on demand. Typically, a user buys or selects a movie or television program and the content is almost immediately streamed to a set-top box. Some VOD systems deliver VOD content using the Internet protocol (IP). The set-top box then begins to play the content on a television coupled to the set-top box. Often, while watching, the user can pause, rewind, fast forward, or reposition playback of the content. The service provider alters the content stream to accommodate the user's pausing, rewinding, fast forwarding, or repositioning.

The VOD content is often encrypted by the provider before it is transmitted to the set-top box. The set-top box receives the encrypted content and decrypts the content. Then, the set-top box may provide the content to the television in yet another encrypted format.

BRIEF DESCRIPTION OF THE DRAWINGS

FIG. 4B is a block diagram of exemplary components of the portable device of FIGS. 1 and 2;

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Like set-top boxes (STBs), consumer electronic (CE) devices (mobile phones, tablet computers, etc.) can receive, decrypt, and play content. STBs and CE devices, however, often operate using different technology standards. For example, the preferred transmission and encryption format for CE devices is typically different than the preferred transmission and encryption format for STBs. Network providers often encrypt content according to the Conditional Access System (CAS) standard before sending the content to STBs. Further, network providers also often stream content to STBs using the MPEG-TS (Motion Picture Expert Group-Transport Stream) standard over UDP (User Datagram Protocol). On the other hand, CE devices often receive and decrypt content using the DTCP-IP (Digital Transmission Content Protection-Internet Protocol) standard. Further, consumer electronic devices often receive streaming content using DLNA (Digital Living Network Alliance) over HTTP (hypertext transfer protocol).

Additionally, the "trick-mode" commands sent from STBs to network providers often differ from the type of "trick-mode" commands sent by CE devices. "Trick-mode" commands include commands for performing tasks such as pausing, rewinding, fast forwarding, and repositioning play of content. For example, STBs often send trick-mode commands using RTSP (Real-Time Streaming Protocol). On the other hand, CE devices often use DLNA trick-mode commands.

Embodiments disclosed herein allow for the conversion of one streaming format to another streaming format (e.g., from MPEG-TS/UDP to DLNA/HTTP); the conversion from one encryption format to another encryption format (e.g., CAS to DTCP-IP); and the conversion from one trick-mode format to another (e.g., DLNA to RTSP). Using these conversions, a CE device may stream content from a network provider, where the content is sent from the network provider in one format (e.g., MPEG-TS/UDP) but received by the CE device in another format (e.g., DLNA/HTTP). Further, content may be sent from the network provider using one encryption format (e.g., CAS) but received by the CE device in another encryption format (e.g., DTCP-IP). Further still, trick-mode commands sent from the CE device may be sent according to one protocol (e.g., DLNA) but received by the network provider according to another protocol (e.g., RTSP). In one embodiment, a STB (e.g., in a user's home) may perform the conversion from one streaming format to another (e.g., MPEG-TS/UDP to DLNA/HTTP) and from one encryption format to another (e.g., CAS to DTCP-IP). The STB may also perform the conversion of trick-mode commands from one format to another (e.g., from DLNA to RTSP).

Figure 1:
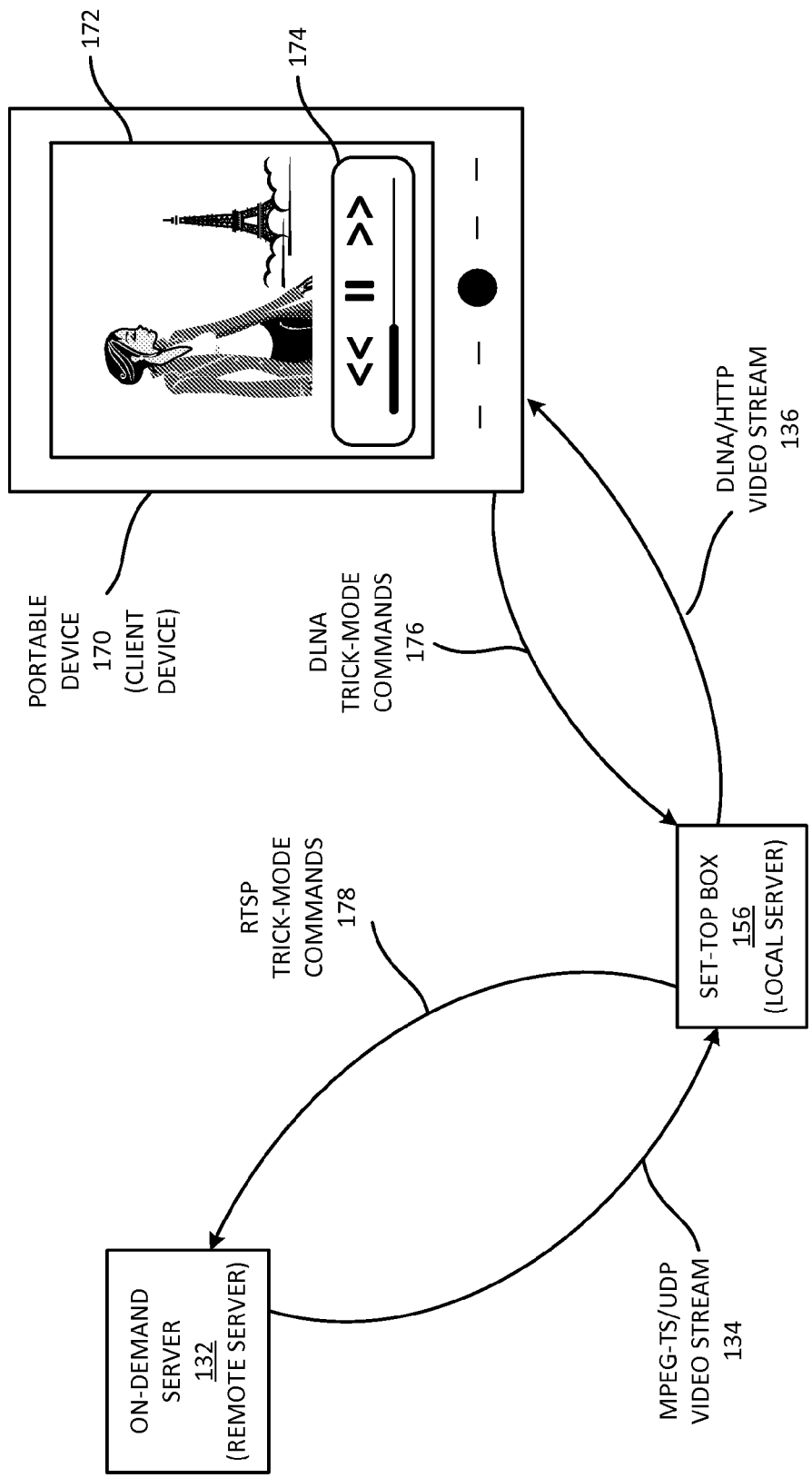
FIG. 1 is a diagram of an overview of an exemplary embodiment for streaming content from a network provider to a consumer electronic device in one embodiment.

FIG. 1 is a diagram of an overview of an exemplary embodiment for watching content streamed from a network provider to a CE device. As shown in FIG. 1, on-demand server 132 (e.g., a network provider's remote server) may transmit a stream 134 of on-demand content to STB 156 (e.g., a local server in a user's home) in one format (e.g., MPEG-TS) over UDP. STB 156 may convert this stream to a stream 136 in another format (e.g., DLNA over HTTP) for delivery to a portable device 170 (e.g., a client or CE device) for display on a display 172. The user may touch display 172 to pause, rewind, fast forward, reposition the play of the content, etc. (e.g., using a dialog box 174). In this case, DLNA trick-mode commands 176 are transmitted from portable device 170 to STB 156. STB 156 may then convert these DLNA commands 176 into RTSP trick-mode commands 178 to send to on-demand server 132. On-demand server 132 may then adjust stream 134 accordingly, which is sent to STB 156. STB 156, in turn, transmits the adjusted stream (in a different format as stream 136) to portable device 170. Additionally, responses to the RTSP trick mode command may be translated and handed back to the CE device via DLNA trick mode response wherever applicable.

Figure 2:
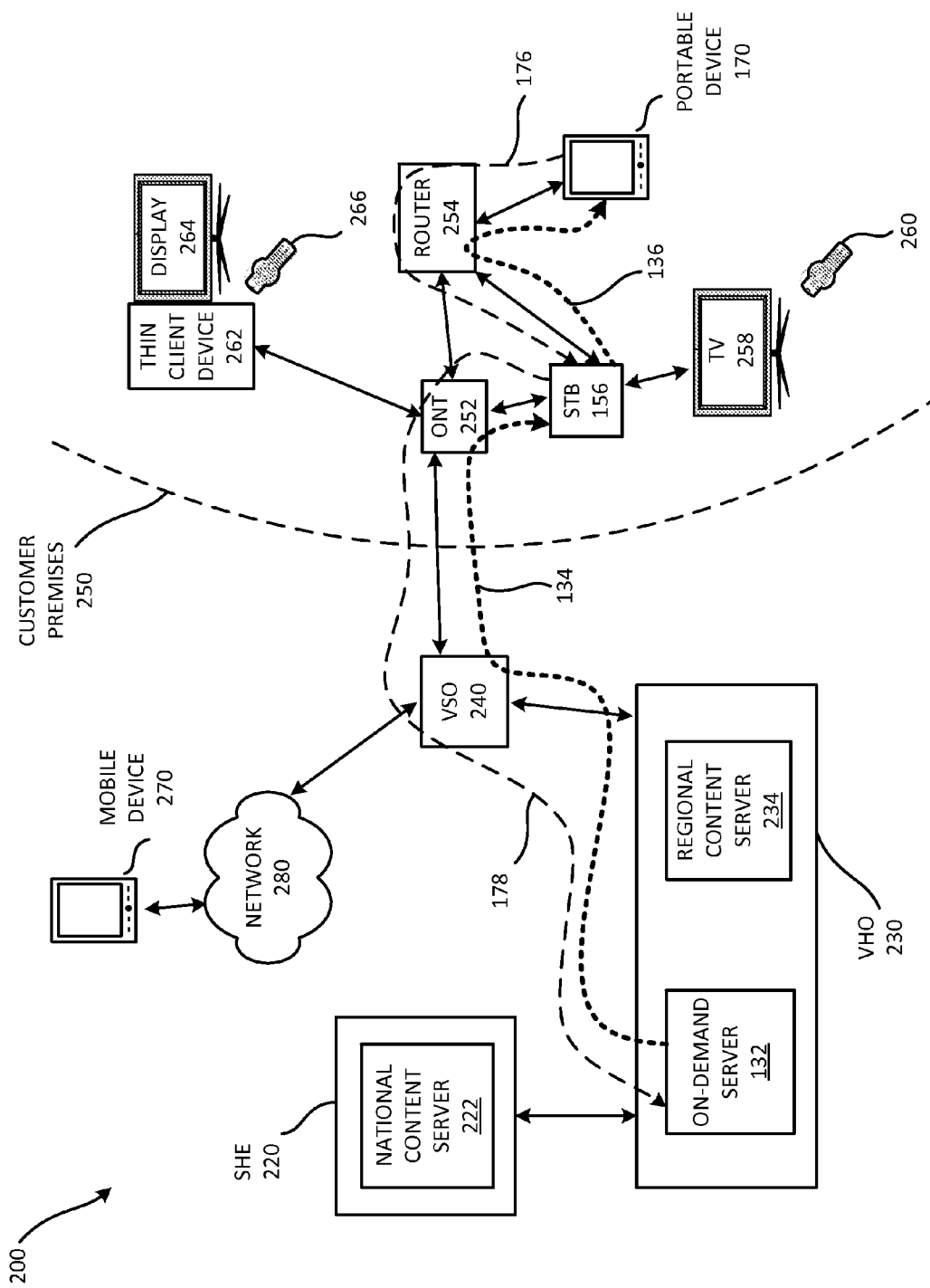
FIG. 2 is a diagram of an exemplary network for implementing the embodiment of FIG. 1 and other embodiments.

FIG. 2 is a diagram of an exemplary network 200 for implementing embodiments described herein. Network 200 may include a super head end (SHE) 220, a video hub office (VHO) 230, a video service office (VSO) 240, customer premises 250, a mobile device 270, and a network 280. VSO 240, VHO 230, and other devices in network 200 may form part of a high-speed fiber optic network (e.g., FiOS™).

As shown in FIG. 2, customer premises 250 (e.g., a customer's home) includes STB 156 and portable device 170 discussed above with respect to FIG. 1. Customer premises 250 may also include an optical network terminal (ONT) 252, a router 254, a television 258 and remote control 260 (both associated with STB 156), and a thin client device 262 associated with display 264 and a remote control 266. Devices in customer premises 250 may be considered CE devices or client devices (e.g., such as portable device 170).

ONT 252 may receive data, e.g., on a fiber optic cable, and may transmit data to the appropriate device in customer premises 250, such as STB 156 or thin client device 262. Likewise, ONT 252 may receive data from any device in customer premises 250 and may transmit the data to other devices in network 200, e.g., through a fiber optic cable. ONT 252 may provide customer premises 250 with Internet access, television access, telephone service, etc. In one implementation, customer premises 250 may include a cable modem for receiving and transmitting data rather than an optical network terminal.

Router 254 may receive data (e.g., a packet) on one port and may forward the received data on another port in the direction of the destination of the data. For example, router 254 may receive a packet from portable device 170 and may forward the packet to ONT 252, STB 156, etc. Likewise, router 254 may receive a packet from STB 156, ONT 252, etc., and may forward the packet to portable device 170. Router 254 may also include a switch, a hub, a firewall, etc. Router 254 may also employ wireless standards (e.g., WiFi), such as 802.11a/b/g/n.

STB 156 may receive content and output the content to TV 258 for display. STB 156 may include a component (e.g., a cable card or a software application) that interfaces with (e.g., plugs into) a host device (e.g., a personal computer, TV 258, a stereo system, etc.) and allows the host device to display content. STB 156 may also be implemented as a home theater personal computer (HTPC), an optical disk player (e.g., digital video disk (DVD) or Blu-Ray™ disc player), a cable card, etc. STB 156 may receive commands or data from other devices in network 200, such as remote control 260, and may transmit data to other devices in network 200 (e.g., to on-demand server 132).

In one embodiment, STB 156 streams content from on-demand server 132 in one format (e.g., MPEG-TS/UDP) and converts it to another format (e.g., DLNA/HTTP) for delivery to a CE device, such as portable device 170. In this embodiment, STB 156 may also decrypt the stream from one format (e.g., CAS) that may then be encrypted in another format (DTCP-IP). Further, STB 156 may receive trick-mode commands in one format (e.g., DLNA) and convert it into another format (e.g., RTSP). Although these above tasks are described as being performed by STB 156, these tasks may also be performed by other devices, such as a dedicated computer running in customer premises 250.

As shown, STB 156 may have access to more than one data path on which to send and receive data. A first data path (e.g., between STB 156 and ONT 252) may carry, for example, cable-TV broadcast signals in analog or digital format (e.g., MPEG-2 or MPEG-4 data streams). In one embodiment, many TV broadcast signals may travel through this first data path to STB 156 simultaneously. This first data path may be bidirectional and may allow data to be sent from STB 156 to, for example, on-demand server 132.

In one embodiment, a second data path (e.g., between STB 156 and router 254) may carry additional data to or from STB 156. This second data path may implement a packet-switched data protocol, such as IP, Ethernet, and/or IP over Ethernet. As such, the second data path may pass through router 254. In another embodiment, second data path does not pass through router 254 but may pass directly to ONT 252. In one embodiment, the second data path is not shared with video content delivered to STB 156 or to other customer homes. In one embodiment, this second data path may be used to stream content (e.g., stream 136 using DLNA/HTTP) to portable device 170. Further, this second data path may be used to receive trick-mode commands (e.g., DLNA trick-mode commands 176) from portable device 170.

TV 258 may output content it receives from STB 156, for example. TV 258 may include speakers as well as a display (e.g., display 102 of FIG. 1). Remote control 260 may issue wired or wireless commands for controlling other electronic devices, such as TV 258 or STB 156. Remote control 260, in conjunction with STB 156, may allow a user to interact with an application running on STB 156. Other types of devices (e.g., a keyboard, mouse, mobile phone, etc.) may be used instead of remote control 260.

Portable device 170 may include a CE device, such as a tablet computer, a mobile phone, a laptop, a Personal Digital Assistant (PDA), or another portable communication device. In one embodiment, portable device 170 may download and run applications, including applications from Apple's™ App Store, Amazon's™ Application store for Android or Kindle devices, Google's Marketplace for Android devices, Verizon's Application store for Android devices, etc. In one embodiment, portable device 170 may include a modem, standards-compliant browser that can execute JavaScript, HTML5, etc. In one embodiment, portable device 170 may receive video stream 136 from STB 156 for display. In this embodiment, portable device 170 may also transmit trick-mode commands 176 to STB 156 (e.g., for conversion and delivery to on-demand server 132).

In another embodiment, thin client device 262 may also be a CE device. As such, thin client device 262 (like portable device 170) may receive a video stream in one format (e.g., DLNA/HTTP) from STB 156 (e.g., that originated from on-demand server 132) for display on display 264. Remote control 266 may issue wired or wireless commands for controlling other electronic devices, such as thin client device 262 or display 264. Remote control 266, in conjunction with thin client device 262, may allow a user to interact with an application running on thin client device 262, such as an application to play content in conjunction with trick-mode commands. Using remote control 266, a user may fast forward, rewind, pause, reposition play of the stream, etc. In this case, thin client device 262 may transmit trick-mode commands to STB 156. As with portable device 170, STB 156 may convert the trick-mode commands from thin client device for delivery to on-demand server 132.

As shown in FIG. 2, portable device 170 is in customer premises 250 and uses router 254 to communicate with STB 156. In another embodiment, mobile device 270 is outside customer premises 250 and may connect to network 200 through a cellular data network (e.g., network 280). Mobile device 270 may include a tablet computer, a mobile phone, a laptop, a Personal Digital Assistant (PDA), or another portable communication device. In one embodiment, mobile device 270 may download and run applications, including applications from Apple's™ App Store, Amazon's™ Application store for Android or Kindle devices, Google's Marketplace for Android devices, Verizon's Application store for Android devices, etc. In one embodiment, mobile device 270 may include a modem, standards-compliant browser that can execute JavaScript, HTML5, etc. In one embodiment, mobile device 270 may receive video stream 136 from STB 156 (e.g., through network 280) for display. In this embodiment, mobile device 270 may also transmit (e.g., through network 280) trick-mode commands to STB 156 (e.g., for conversion and delivery to on-demand server 132) through network 280.

Customer premises 250 may connect to VSO 240. VSO 240 may deliver content to customer premises 250 and may receive data from customer premises 250 for forwarding to the proper destination (e.g., on-demand server 132). VSO 240 may include a content server for transcoding and multiplexing content from different sources for delivery to customer premises 250.

SHE 220 may include a national content server 222. National content server 222 may include a source of for-pay television broadcasts (e.g., TNT, ESPN, HBO, Cinemax, CNN, etc.). VHO 230 may include an on-demand server 132 and a regional content server 234. Regional content server 234 may provide television broadcasts (e.g., local broadcasts, such as NBC, CBS, ABC, Fox, local cable access channels, etc.). On-demand server 132 may provide on-demand content (e.g., movies, TV programs, etc).

Network 280 may include one or more packet switched networks, such as an Internet protocol (IP) based network, a local area network (LAN), a wide area network (WAN), a personal area network (PAN), an intranet, the Internet, a cellular network, a fiber-optic network, or another type of network that is capable of transmitting data. Network 280 may include a circuit-switched network, such as a public-switched telephone network (PSTN) for providing telephone services for traditional telephones. Network 280, in conjunction with components in VSO 240, may allow devices at customer premises 250 (e.g., STB 156) to connect to other devices also attached to network 280.

The exemplary configuration of devices in network 200 is illustrated for simplicity. Network 200 may include more devices, fewer devices, or a different configuration of devices than illustrated in FIG. 2. For example, network 200 may include thousands or millions of customer premises. In some embodiments, the functions performed by two or more devices may be performed by any one device. Likewise, in some embodiments, the functions performed by any one device may be performed by multiple devices. Further, the connections shown in FIG. 2 are exemplary. In other embodiments, additional connections that are not shown in FIG. 2 may exist between devices (e.g., each device may be connected to every other device). The connections in FIG. 2 may also be wireless or wired.

Figure 3:
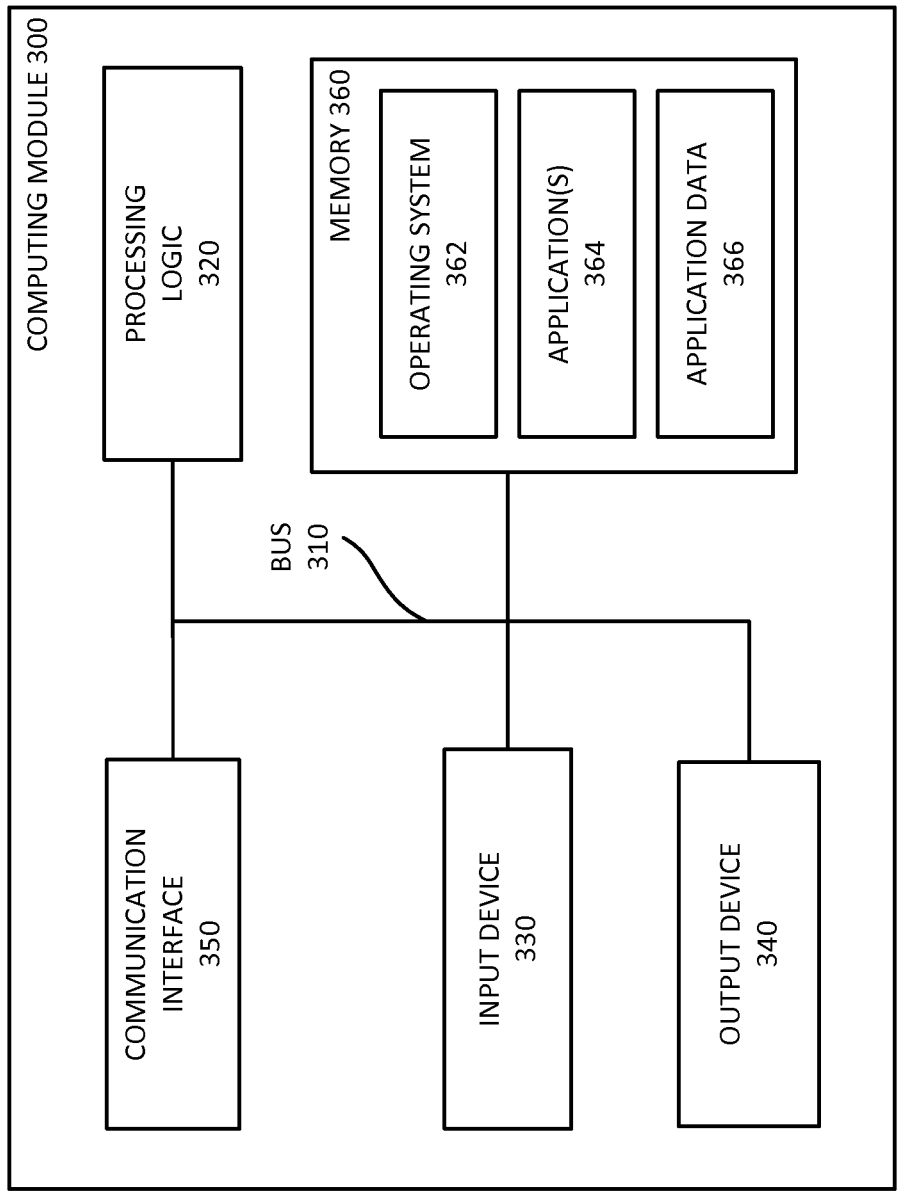
FIG. 3 is a block diagram of exemplary components of a computing module found in the devices of FIGS. 1 and 2.

Devices in network 200 may each include one or more computing modules. FIG. 3 is a block diagram of exemplary components of a computing module 300. Computing module 300 may include a bus 310, processing logic 320, an input device 330, an output device 340, a communication interface 350, and a memory 360. Computing module 300 may include other components (not shown) that aid in receiving, transmitting, and/or processing data. Moreover, other configurations of components in computing module 300 are possible.

Bus 310 may include a path that permits communication among the components of computing module 300. Processing logic 320 may include any type of processor or microprocessor (or families of processors or microprocessors) that interprets and executes instructions. In other embodiments, processing logic 320 may include an application-specific integrated circuit (ASIC), a field-programmable gate array (FPGA), etc.

Input device 330 may allow a user to input information into computing module 300. Input device 330 may include a keyboard, a mouse, a pen, a microphone, a remote control (e.g., remote control 260), an audio capture device, an image and/or video capture device, a touch-screen display, etc. Some devices in network 200, such as servers in VHO 230, may be managed remotely and may not include input device 330. In other words, some devices may be "headless" and may not include a keyboard, for example.

Output device 340 may output information to the user. Output device 340 may include a display, a printer, a speaker, etc. For example, portable device 170 may include display 172 (an output device), which may include a liquid-crystal display (LCD) for displaying content to the user. As another example, ONT 252 and STB 156 may include light-emitting diodes (LEDs). Headless devices, such as servers in VHO 230 may be managed remotely and may not include output device 340.

Input device 330 and output device 340 may allow a user to activate and interact with a particular service or application, such as a web browser or an application to search for and discover content. Input device 330 and output device 340 may allow a user to receive and view a menu of options and select from the menu options. The menu may allow the user to select various functions or services associated with applications executed by computing module 300.

Communication interface 350 may include a transceiver that enables computing module 300 to communicate with other devices or systems. Communication interface 350 may include a transmitter that converts baseband signals to radio frequency (RF) signals or a receiver that converts RF signals to baseband signals. Communication interface 350 may be coupled to an antenna for transmitting and receiving RF signals. Communication interface 350 may include a network interface card, e.g., Ethernet card, for wired communications or a wireless network interface (e.g., a WiFi) card for wireless communications. Communication interface 350 may also include, for example, a universal serial bus (USB) port for communications over a cable, a Bluetooth™ wireless interface, a radio-frequency identification (RFID) interface, a near-field communications (NFC) wireless interface, etc.

Memory 360 may store, among other things, information and instructions (e.g., applications 364 and operating system 362) and data (e.g., application data 366) for use by processing logic 320. Memory 360 may include a random access memory (RAM) or another type of dynamic storage device, a read-only memory (ROM) device or another type of static storage device, and/or some other type of magnetic or optical recording medium and its corresponding drive (e.g., a hard disk drive).

Operating system 362 may include software instructions for managing hardware and software resources of computing module 300. For example, operating system 362 may include Linux, Solaris, Windows, OS X, iOS, Android, an embedded operating system, etc. Applications 364 and application data 366 may provide network services or include applications, depending on the device in which the particular computing module 300 is found.

Computing module 300 may perform the operations described herein in response to processing logic 320 executing software instructions stored in a non-transient computer-readable medium, such as memory 360. A computer-readable medium may include a physical or logical memory device. The software instructions may be read into memory 360 from another computer-readable medium or from another device via communication interface 350. The software instructions stored in memory 360 may cause processing logic 320 to perform processes that are described herein.

Figure 4A:
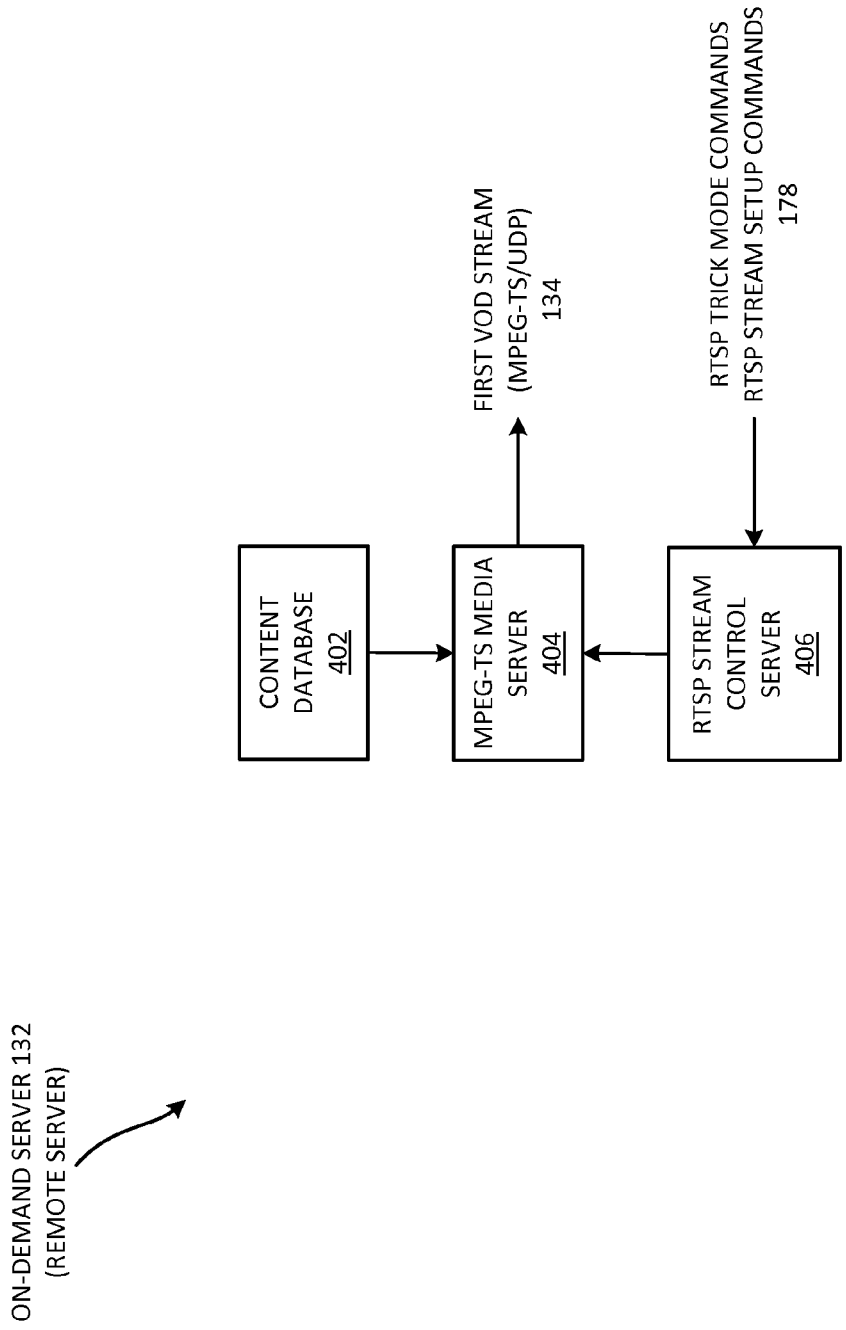
FIG. 4A is a block diagram of exemplary components of the on-demand server of FIGS. 1 and 2.

As described above with respect to FIGS. 1 and 2, on-demand server 132 may include a database of content and means to deliver that content to customer premises 250. FIG. 4A is a block diagram of exemplary components of on-demand server 132 (e.g., functions performed by application 364 in processing logic 320 or stored in memory 360 of on-demand server 132). On-demand server 132 may include a content database 402, an MPEG-TS media server 404, and RTSP stream control server 406. On-demand server 132 may include more, fewer, or a different arrangement of components than illustrated in FIG. 4A.

Content database 402 may store video and audio content that users in customer premises 250 may select for watching on an on-demand basis. Video and audio content may include movies, TV programs, music, etc.

MPEG-TS media server 404 may stream the content stored in content database 402 to customer premises 250 (e.g., through VSO 240). Media server 404 may stream the content according to the MPEG-TS standard format for audio and video. The transport stream may include an MPEG-2 stream, for example, delivered to customer premises 250 using UDP packets. While media server 404 is described as implementing the MPEG-TS standard, media server 404 may implement other standards.

RTSP stream control server 406 may set up and control the stream of content from on-demand server 132 (e.g., from media server 404) to customer premises 250. For example, stream control server 406 may receive a selection of content from customer premises 250 for a piece of content (e.g., a stream setup command). Stream control server 406 may establish the parameters for a session (e.g., a MPEG-TS/UDP session) to deliver the content to customer premises 250. These parameters for the session are passed to media server 404 so that media server 404 may deliver the selected content to customer premises 250 in the appropriate format. In some situations there may not be a one-to-one correspondence between DLNA trick-mode commands and RTSP trick-mode commands. For example multiple DLNA trick-mode commands (e.g., requests) may translate into fewer RTSP trick-mode commands (e.g., to achieve the same semantic).

RTSP stream control server 406 may also interpret RTSP trick-mode commands from customer premises 250 and may adjust the MPEG-TS media stream accordingly. For example, stream control server 406 may receive an RTSP pause command from customer premises 250. In this case, stream control server 406 may instruct media server 404 to pause the content stream being delivered to customer premises 250. As another example, stream control server 406 may receive an RTSP fast-forward command from customer premises 250. In this case, stream control server 406 may instruct media server 404 to deliver the content stream to customer premises 250 in a faster manner (e.g., transmitting every other frame or every set number of frames).

As described above with respect to FIG. 2, a client device (e.g., portable device 170, thin client device 262, etc.) may allow a user to play content on a display. In one embodiment, the content is delivered to the client device using the DLNA standard. FIG. 4B is a block diagram of exemplary components of a client device (e.g., functions performed by application 364 in processing logic 320 or stored in memory 360 of portable device 170 or thin client device 262). The client device may include a UI client 422 and a DLNA client 424. DLNA client 424 may include a DLNA media client 426, DTCP-IP decrypt logic 428, and a DLNA stream control client 430. A client device, such as portable device 170, may include more, fewer, or a different arrangement of components than illustrated in FIG. 4B.

UI client 422 receives information about content (e.g., a list of content) from a local server, such as STB 156. UI client 422 may display the information about the content to the user so that the user may browse and select a particular piece of content. In the case of portable device 170, UI client 422 may display the list of content on display 172. In the case of thin client device 262, UI client 422 may display the list of content on display 264. When UI client 422 receives the selection for the content from the user, UI client 422 may transmit the selection to the local server (e.g., STB 156). The local server may ensure that the selected content is delivered to the client device (e.g., portable device 170) for the user to enjoy. In the case of portable device 170, the user may select the content by touching a display 172 (e.g., a touch screen display). In the case of thin client device 262, the user may select the content by using remote control 266.

DLNA media client 426 receives content (e.g., as a DLNA media stream over HTTP) (e.g., from the local server such as STB 156). In one embodiment, the DLNA media stream may be encrypted (e.g., with DTCP-IP encryption). In this case, DTCP-IP decrypt logic 428 may decrypt the DLNA media stream. After decryption, the content in the media stream may be decoded by DLNA media client 426 for rendering on a display, such as display 172 of portable device 170. In the case of thin client device 262, the content may be rendered on display 264. The content may also be encrypted (yet again) between thin client device 262 and display 264 using, for example, the HDCP (High-Definition Copy Protection) protocol.

The user of portable device 170 may wish to use trick-mode commands (such as pause, rewind, fast-forward, etc.) while watching the content provided by DLNA media client 426. In this case, the user may input a trick-mode command to the client device. For example, in the case of portable device 170, the user may touch dialog box 174 of display 172. In the case of thin client device 262, the user may touch a button on remote control 266. In this case, DLNA stream control client 430 receives the trick-mode command from the user and transmits this trick-mode command to the local server (e.g., STB 156).

In one embodiment, the client device (e.g., portable device 170 or thin client device 262) may include a content browsing and playing application ("app"). This content browsing and playing app may include DLNA client 424 and UI client 422, for example. This content browsing and playing app may include an application (e.g., a light-weight application) purchased or downloaded, for example, from Apple's App Store, Amazon's App Store for Android or Kindle devices, Google's Marketplace for Android devices, Verizon's Application Store for Android devices, etc. In one embodiment, the application may include a modern, standards-compliant browser that can execute JavaScript, HTML5, etc.

Figure 4C:
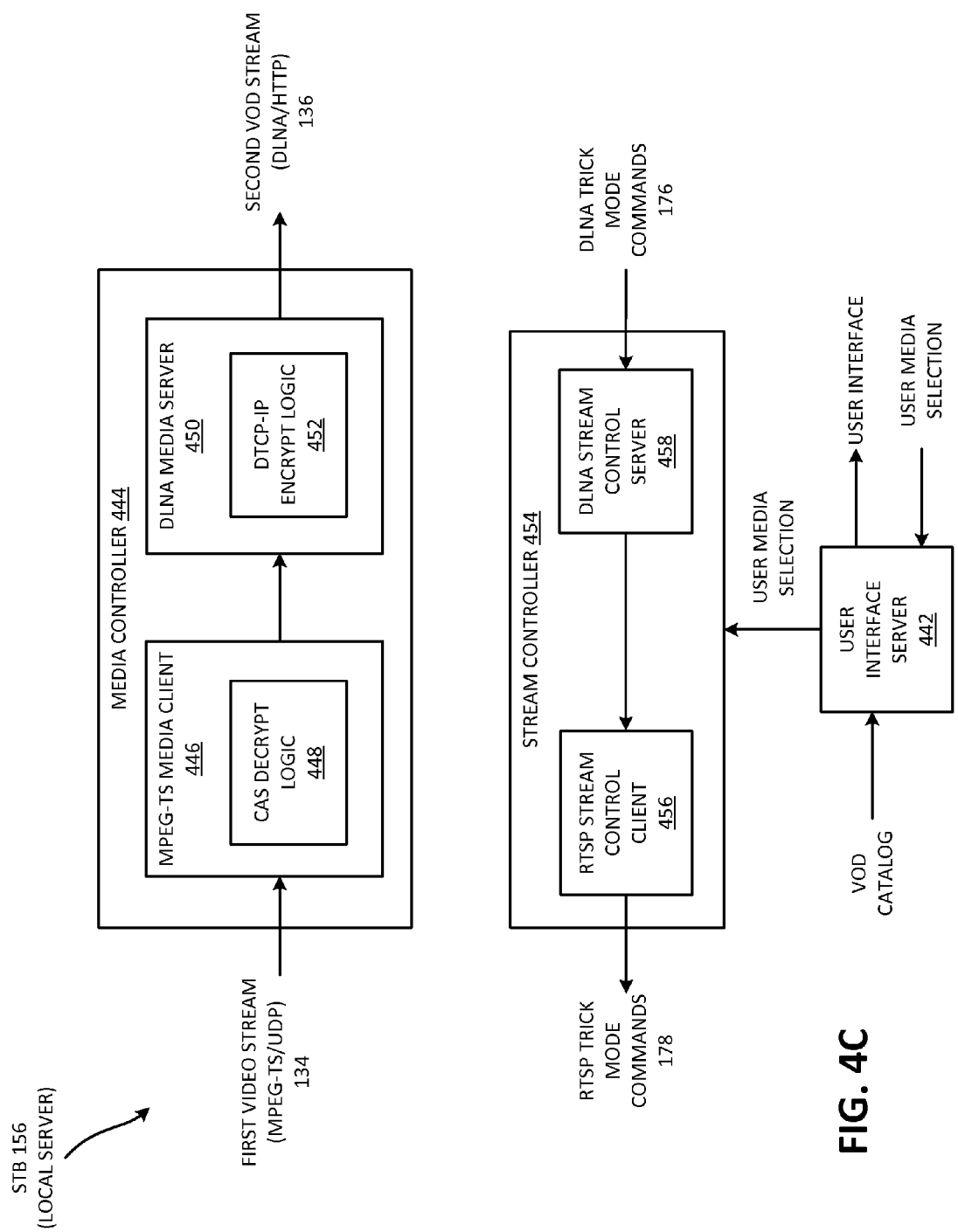
FIG. 4C is a block diagram of exemplary components of the set-top box of FIGS. 1 and 2.

As described above with respect to FIG. 2, a local server (e.g., STB 156) may receive content as a first stream 134 (e.g., a MPEG-TS/UDP stream) and deliver the content to a client device as a second stream 136 (e.g., a DLNA/HTTP stream). Further the local server may receive trick-mode commands 176 according to one protocol (e.g., DLNA), translate those commands to a second protocol (e.g., RTSP), and transmit the translated trick-mode commands 178 to a remote server (e.g., on-demand server 132). FIG. 4C is a block diagram of exemplary components of a local server (e.g., functions performed by application 364 in processing logic 320 or stored in memory 360 of STB 156). The local server may include UI server 442, media controller 444, and stream controller 454. Media controller 444 may include MPEG-TS media client 446, CAS decrypt logic 448, DLNA media server 450, and DTCP-IP encrypt logic 452. Further, stream controller 454 may include RTSP stream control client 456 and DLNA stream control server 458.

UI server 442 may interact with UI client 422, describe above, in the client device (e.g., portable device 170). UI server 442 may transmit information about content to a client device (e.g., portable device 170). UI server 442 may also receive a selection of a particular piece of content from the client device. When UI server 442 receives the selection for the content from the user, UI server 442 may pass the selection to the stream controller 454 so that stream controller 454 may set up the streaming media session to receive the selected content for the user.

Media controller 444 may receive content in first stream 134 (e.g., according one protocol) and convert the received stream into a second stream 136 (e.g., according to another protocol) for delivery to a client device. For example first stream 134 may be a MPEG-TS/UDP stream from a remote server, such as on-demand server 132. Second stream 136 may be a DLNA/HTTP media stream. Further, in one embodiment, the first stream 134 may be encrypted according to CAS and the second media stream 136 may be encrypted according to a different standard, such as DTCP-IP.

MPEG-TS media client 446 may receive the MPEG-TS stream (e.g., stream 134) from the remote server, such as on-demand server 132. In one embodiment, CAS decrypt logic 448 decrypts the MPEG-TS stream 134. DLNA media server 450 may receive the decrypted MPEG-TS stream and, in one embodiment, DTCP-IP encrypt logic 452 may encrypt it according to the DTCP-IP standard. In particular, DTCP-IP encrypt logic 452 may encrypt any content that is delivered to media controller 444 in an encrypted format. DLNA media server 450 may then deliver the content as a DLNA/HTTP media stream. Media controller 444 may receive first video stream 134 and convert it into second video stream 136

Stream controller 454 may send commands to a remote server, such as on-demand server 132, to setup a streaming session for streaming content to customer premises 250 and for controlling the stream according to trick-mode commands from the user (e.g., pause, rewind, fast forward, etc). DLNA stream control server 458 receives trick-mode commands 176 (e.g., in a first protocol format, such as DLNA trick-mode commands) from a client device, such as portable device 170. Stream controller 454 then translates or converts these received commands into a second protocol format (e.g., such as RTSP trick-mode commands). RTSP stream control client 456 may then send trick-mode commands 178 in a second protocol format (e.g., RTSP) to the remote server, such as on-demand server 132. The remote server may then adjust the stream of content from the remote server to the local server according to the user's trick-mode commands. For example, if the user enters a pause command, then stream 134 from the remote server (e.g., on-demand server 132) to the local server (e.g., STB 156) may be paused. Likewise, stream 136 from the local server (e.g., STB 156) to the client device (e.g., portable device 170) may also be paused according to the user's pause command.

A local server, such as STB 156, may include more, fewer, or a different arrangement of components than illustrated in FIG. 4C. For example, the local server may include a buffer (not shown). The buffer may store the on-demand content streamed from the remote server. In one embodiment, the buffer may store on-demand video that has not yet been transmitted to the client device for play. For example, when stream 136 is paused, stream 134 may continue in order to fill the buffer. In this way, when the user begins to replay the content, the content may be streamed from the buffer in the local server to the client device without issuing a trick-mode command to on-demand server 132, for example. Further, should the local server receive a fast-forward command, the local server may deliver fast-forwarded content from the buffer rather than issuing a trick-mode command to the remote server. In this case, the local server may issue a trick-mode command (e.g., fast forward) to the remote server when the buffer is close to being emptied.

In another embodiment, the local server may keep a buffer of already-played content (e.g., 30 seconds, 1 minute, 2 minutes, etc. of played content). In this manner, when the local server receives a rewind trick-mode command, the local server may rewind from the video stored in the buffer without issuing a trick-mode command to the remote server. In this example, the local server may continue to receive the video stream from the remote server until the buffer (e.g., the buffer of not-yet-played video) is full. In this case, the local server may issue a trick-mode command (e.g., rewind) to the remote server when the buffer is close to being emptied.

Figure 5A:
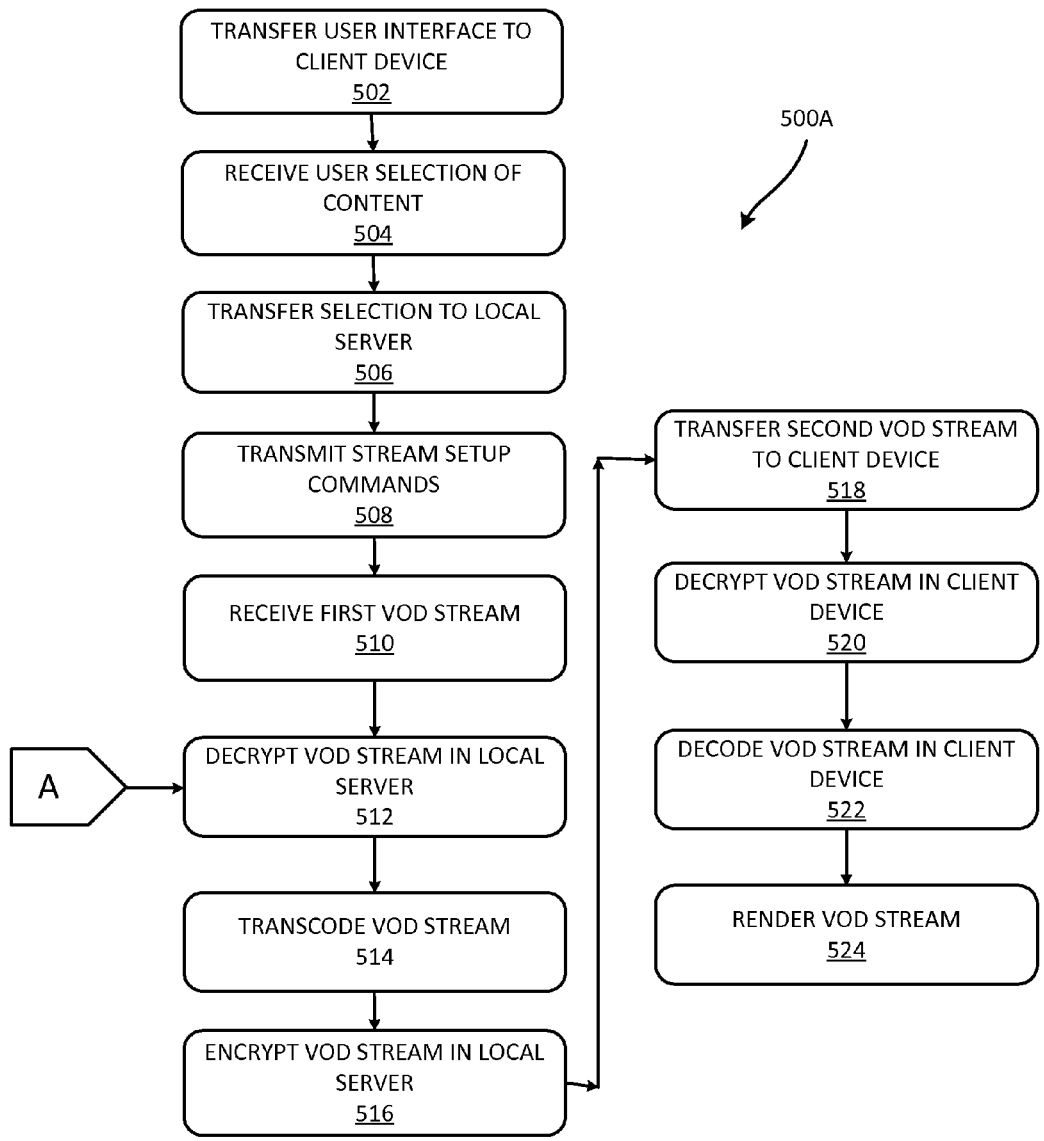
FIGS. 5A and 5B are flowcharts of exemplary processes for translating between streaming protocols and trick-mode commands in one embodiment.
Figure 5B:
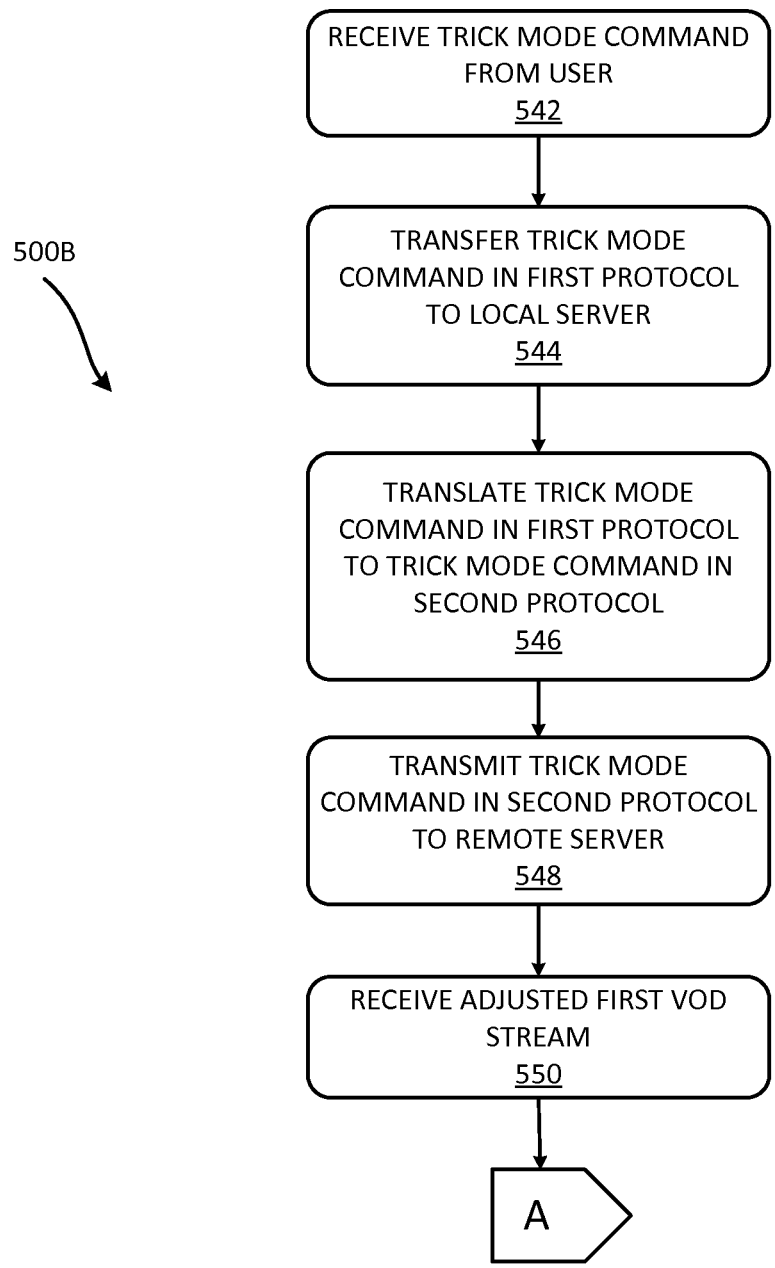

As described above, network 200 may allow a user (e.g., a customer in customer premises 250) to stream content from a network provider to a CE device (while being able to use trick-mode commands, for example). FIGS. 5A and 5B are flowcharts of processes 500A and 500B for streaming content from a network provider to a CE device. Processes 500A and 500B are described with respect to a client device, a local server, and a remote server. In the following example, the client device is portable device 170, the local server is STB 156, and the remote server is on-demand server 132. Processes 500A and 500B may also apply to other client devices, such as thin client device 262 displaying content on display 264. Processes 500A and 500B are also described with respect to FIG. 6, which is a diagram illustrating exemplary messages sent between on-demand server 132 (remote server), STB 156 (local server), and portable device 170 (client device).

In one embodiment, UI server 442 receives catalog information (e.g., VOD catalog message 602) from on-demand server 132 with information about the content available on demand (e.g., a list of content). As shown, process 500A begins with the transfer of a user interface (e.g., in UI message 604) from the local server to the client device (block 502). In this case, portable device 170 may provide a menu of content for the user to select from. The client device receives a selection of content from the user (block 504). In the current example, the user may select a particular piece of content from the menu of content.

Figure 6:
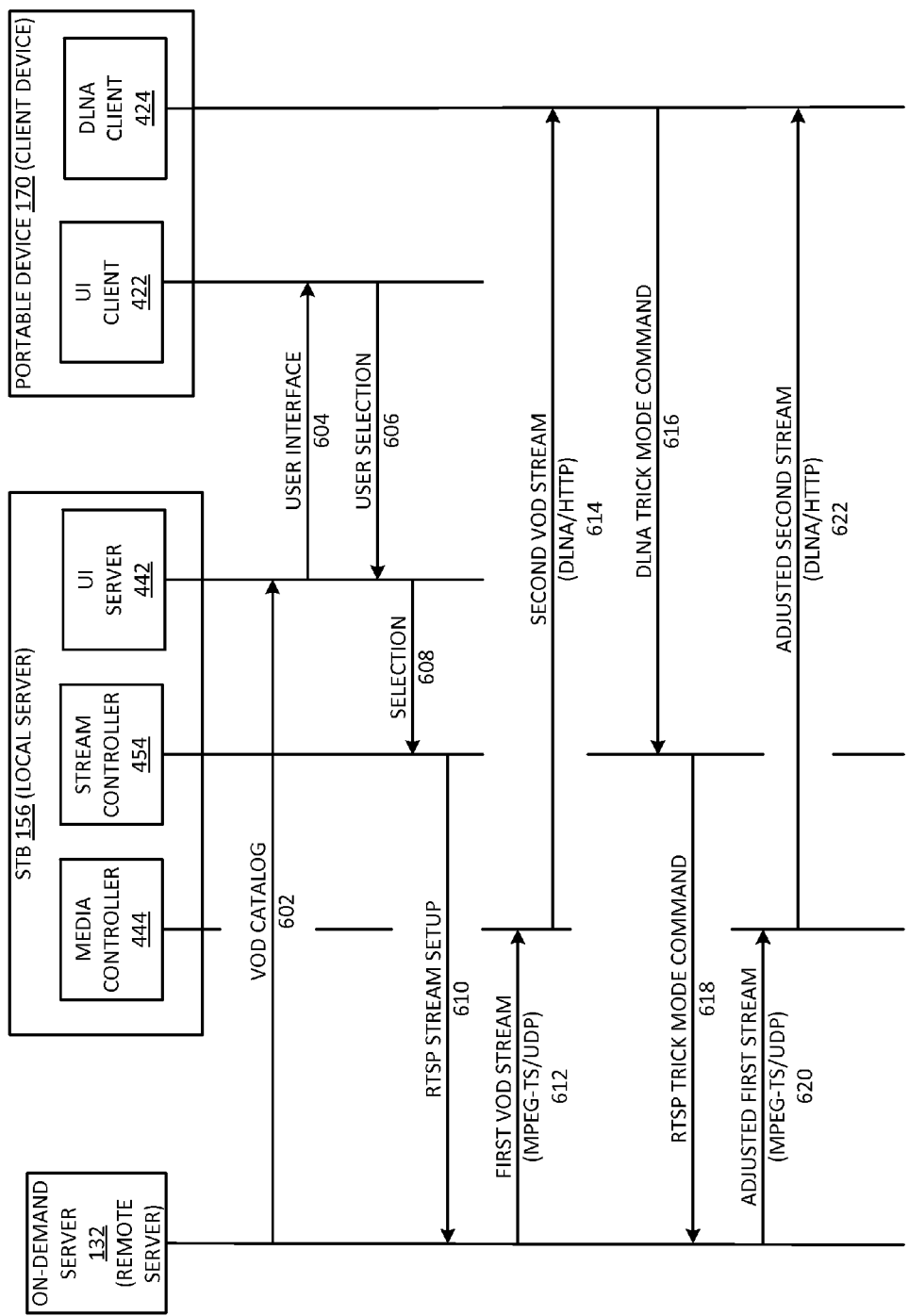
FIG. 6 is a diagram of exemplary messages sent between devices in FIGS. 1 and 2 in one embodiment.

The content selection of the content is transferred from the client device to the local server (block 506). As shown in FIG. 6, portable device 170 transmits content selection message 606 to STB 156, which is intercepted by UI server 442. UI server 442, in turn, may pass the selection (as selection message 608) to stream controller 454. The local server transmits the media stream setup commands to the remote server (block 508). In the current example, stream controller 454 transmits RTSP stream setup message 610 to on-demand server 132 to establish a streaming session between on-demand server 132 and STB 156.

The remote server transmits, and the local server receives a first VOD media stream from the remote server (block 510). As shown in FIG. 6, first VOD stream 612 is an MPEG-TS protocol stream sent over UDP to STB 156, which is intercepted by media controller 444. In one embodiment, the VOD stream may be decrypted in the local server (block 512). As described above, CAS decrypt logic 448 may decrypt first VOD stream 612 when it is encrypted using the CAS standard, for example. In one embodiment, the VOD stream may be transcoded (block 514). For example, if the first VOD stream is encoded using MPEG-2, then STB 156 may transcode the stream into MPEG-4, or any other type of appropriate encoded signal.

In one embodiment, the VOD stream may be encrypted (block 516). In this embodiment, DTCP-IP encrypt logic 452 may encrypt the VOD stream according to the DTCP-IP standard. As mentioned above, this standard is consistent with the DLNA standard. The second VOD stream is transferred to the client device (block 518). In this case, as described above, DLNA media server 450 formats the second VOD stream as a DLNA media stream delivered over HTTP, for example. As shown in FIG. 6, second VOD stream 614 is transmitted from media controller 444 (in STB 156) and received by DLNA client 424 (in portable device 170).

In one embodiment, the local server converts the first stream into the second stream immediately (or near immediately) upon receipt of the first stream. Further, the second stream is transmitted to the client device immediately (or near immediately) upon conversion. In this case, the local server operates in "real-time" (e.g., near real-time or as quickly as the stream is received). In other words, the transmission of the second stream occurs simultaneously with the reception of the first stream. In one embodiment, the local server may include a buffer that stores some of the media content around the current play location. In this embodiment, the buffer stores less than then entire media program being streamed.

The second VOD stream may be decrypted in the client device (block 520). As mentioned above, second VOD stream 614 may be encrypted according to the DTCP-IP standard. DTCP-IP decrypt logic 428 in DLNA media client 426 may decrypt second VOD stream 614. The second VOD stream is decoded in the client device (block 522). For example, DLNA media client 426 may decode the VOD stream, which may be encoded in MPEG-2, MPEG-4, etc. The decoded second VOD stream is rendered by the client device on a display (block 524). For example, as shown in FIG. 1, the user may enjoy the requested streamed video on display 172 of portable device 170. In another implementation, the user may enjoy the requested streamed video on display 264 attached to thin client device 262.

Also as shown in FIG. 1, the user may be presented (e.g., in dialog box 174) with trick-mode options, such as pause, fast forward, rewind, or reposition. Process 500B may begin with the receipt of user input of a trick-mode command (block 542). For example, assume that the user of portable device 170 touches the fast-forward icon on the display of portable device 170 (e.g., dialog box 174). The trick-mode command (in a first protocol) is transferred from the client device to the local server (block 544). In this case, DLNA stream control client 430 outputs a DLNA trick-mode command message 616 of "fast forward" to stream controller 454 in STB 156 (e.g., DLNA stream control server 458). The trick-mode command in message 616 may be translated from the first protocol (e.g., DLNA) to a trick-mode command in a second protocol (RTSP) (block 546). For example, stream controller 454 translates the DLNA command to an RTSP trick-mode command. The trick-mode command (in the second protocol) may be transmitted to the remote server (block 548). For example, RTSP stream control client 456 transmits the RTSP trick-mode command message 618 to on-demand server 132.

The adjusted VOD stream may then be received in the local server from the remote server (block 550). RTSP stream control server 406 communicates with MPEG-TS media server 404 (e.g., both in on-demand server 132) to deliver an adjusted first VOD stream 620. For example, the frame rate in the adjusted VOD stream may be accelerated (e.g., every other frame is transmitted in adjusted first VOD stream 620). Process 500B may then transition to process 500A, block 512, where adjusted first stream 620 (as a MPEG-TS/UDP stream) is converted to an adjusted second VOD stream 622 (as a DLNA/HTTP stream), which is delivered to portable device 170.

When the user wishes to stop the fast forward process, the user may select a "play" command on screen 172 of portable device 170. In this case, process 500B may repeat with a different DLNA trick-mode command that is translated into a different RTSP trick-mode command. Likewise, the user may request to rewind the video, whereby a rewind DLNA command is translated into an RTSP rewind command.

Embodiments disclosed herein may allow a user to stream content from a network provider (e.g., as an MPEG-TS protocol stream over UDP) to a CE device (as a DLNA protocol stream over HTTP). Embodiments may also allow the user to enter and enjoy trick-mode commands (transmitted from the CE device as DLNA trick-mode commands and delivered to the network provider as RTSP trick-mode commands). Embodiments disclosed herein allow for the streaming of content to DLNA-enabled CE devices without refitting a provider's network with DLNA infrastructure. That is, a local server (such as STB 156) may convert one streaming protocol to another and convert trick-mode commands from one protocol to another.

Although embodiments above describe content as originating from on-demand server 132, content may also originate from regional content server 234, national content server 222, etc. Although embodiments described above include MPEG-TS/UDP and DLNA/HTTP protocol streams, conversion between other types of media streams is possible. Although embodiments describe above include conversion between DLNA trick-mode commands and RTSP trick-mode commands, other conversions are possible. Further, streams 134 and 136, for example, may include any type of media, such as video and/or audio.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Further, certain portions of the invention may be implemented as logic that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the articles "a" and the term "one of" are intended to include one or more items. Further, the phrase "based on" is intended to mean "based, at least in part, on" unless explicitly stated otherwise.

What is claimed is:

1. A method comprising:
    receiving content in a first media stream, in a first network device from a remote network device, using a first network protocol, wherein the first network protocol includes a MPEG-TS (Motion Picture Expert Group-Transport Stream) protocol;
    decrypting media in the first media stream from a first encrypted format to generate decrypted media;
    re-encrypting the decrypted media into a second encrypted format to generate re-encrypted media;
    converting the first media stream to a second media stream according to a second network protocol, wherein the second network protocol includes a DLNA (Digital Living Network Alliance)protocol, and wherein the second media stream includes the re-encrypted media in the second encrypted format;

transmitting the content as the second media stream from the first network device to a user device, wherein converting the first media stream includes converting the first media stream in real-time, and transmitting the second media stream to the user device occurs simultaneously with receiving the first media stream;

storing the content transmitted as the second media stream in a buffer of played content in the first network device;

receiving a first trick-mode command according to a first trick-mode protocol from the user device, wherein the first trick-mode command includes a rewind, a fast-forward, or a pause command, and wherein the first trick-mode protocol includes a DLNA trick-mode protocol;

converting the first trick-mode command into a second trick-mode command according to a second trick-mode protocol different than the first trick-mode protocol, wherein the second trick-mode protocol includes a RTSP (Real Time Streaming Protocol) trick-mode protocol;

transmitting the second trick-mode command to the remote network device;

receiving a rewind command according to the first trick-mode protocol from the user device;

retransmitting the content, as the second media stream, from the buffer of played content, in response to receiving the rewind command, to the user device;

continuing to receive the content as the first media stream in the first network device from the remote network device while simultaneously retransmitting the content, as the second media stream, from the buffer of played content to the user device from the first network device;

storing, in a buffer of unplayed content, the content received while simultaneously retransmitting the content as the second media stream from the buffer of played content;

receiving a fast-forward command according to the first-trick mode protocol from the user device;

transmitting, in response to receiving the fast-forward command, the content stored in the buffer of unplayed content as the second media stream to the user device;

determining when the buffer of unplayed content is close to empty while transmitting, in response to receiving the fast-forward command, the content stored in the buffer of unplayed content as the second media stream;

transmitting a fast-forward command in the second trick-mode protocol to the remote network device when determined that the buffer of unplayed content is close to being empty;

determining when the buffer of played content is close to empty while retransmitting, in response to receiving the rewind command, the content stored in the buffer of played content; and transmitting a rewind command in the second trick-mode protocol to the remote network device when determined that the buffer of played content is close to empty.

2. The method of claim 1, wherein converting the first media stream includes converting the first media stream in a set-top box.

3. The method of claim 1, further comprising:
receiving the second media stream in a user device; and
rendering media on a display in the user device based on the second media stream.

4. The method of claim 3, further comprising:
receiving the first trick-mode command from the user; and
transmitting the first trick-mode command from the user device to the first network device.

5. The method of claim 1, further wherein transmitting the second media stream from the buffer of played content in response to receiving the rewind command includes retransmitting the second media stream without receiving the played content from the remote network device a second time.

6. The method of claim 1, further comprising:
determining whether the buffer is close to empty while transmitting the second media stream in response to receiving the fast-forward command, and
without transmitting the fast-forward command in the second trick-mode protocol to the remote network device, transmitting, in response to receiving the fast-forward command, the second media stream based on the first media stream, stored in the buffer, that was received while simultaneously transmitting the second media stream from the buffer of played content.

7. The method of claim 6, further comprising:
receiving a pause command according to the first trick-mode protocol from the user device;
pausing the transmitting of the second media stream from the first network device to the user device; and
continuing to receive the first media stream in the first network device from the remote network device using the first protocol and storing the first media stream in the buffer while simultaneously pausing the second media stream.

8. A system comprising:
a first network device including:
a receiver to receive content as a first media stream, from a remote network device, using a first network protocol, wherein the first network protocol includes a MPEG-TS (Motion Picture Expert Group-Transport Stream) protocol;
a processor to convert the first media stream to a second media stream according to a second network protocol, wherein the second network protocol includes a DLNA (Digital Living Network Alliance) protocol;
a transmitter to transmit the content as the second media stream to a user device; and
a memory to a store a buffer of played content and a buffer of unplayed content, wherein the buffer of played content includes the content transmitted to the user device and the buffer of unplayed content includes the content not transmitted to the user device,
wherein the receiver is configured to receive a first trick-mode command according to a first trick-mode protocol from the user device, wherein the first trick-mode command includes a rewind, a fast-forward, or a pause command, wherein the first trick-mode protocol includes a DLNA trick-mode protocol;
wherein the processor converts the first trick-mode command into a second trick-mode command according to a second trick-mode protocol different than the first trick-mode protocol, wherein the second trick-mode protocol includes a RTSP (Real Time Streaming Protocol) trick-mode protocol,
wherein the transmitter is configured to transmit the second trick-mode command to the remote network device,
wherein the receiver is configured to receive a rewind command according to the first trick-mode protocol from the user device, wherein the transmitter is configured to retransmit the content, as the second media stream, from the buffer of played content to the user device in response to receiving the rewind command, wherein the receiver is configured to continue to receive the content as the first media stream from the remote network device while the transmitter simultaneously retransmits the content from the buffer of played content to the user device, and the memory is configured to store the received content in the buffer of unplayed content while the transmitter simultaneously retransmits the content from the buffer of played content, wherein the receiver is configured to receive a fast-forward command according to the first trick-mode protocol from the user device, wherein the transmitter is configured to transmit, in response to the receiver receiving the fast-forward command, the content, as the second media stream, stored in the buffer of unplayed content, wherein the process is configured to decrypt media in the first media stream from a first encrypted format that re-encrypt the media into a second encrypted format, wherein the second media stream includes the re-encrypted media in the second encrypted format, wherein the processor is configured to convert the first stream in real-time, and the transmitter is configured to transmit the second media stream to the user device simultaneously while the receiver receives the first media stream, wherein the processor is configured to determine when the buffer of unplayed content is close to empty while the transmitter transmits the content as the second media stream from the buffer of unplayed content, and wherein the transmitter is configured to issue a fast-forward command in the second trick-mode protocol to the remote network device when the processor determines that the buffer is close to empty.

9. The system of claim 8, wherein the first network device includes a set-top box.

10. The system of claim 8, further comprising the user device including a receiver to receive the second media stream, and a display to display media based on the second media stream.

11. the system of claim 10, wherein the receiver in the user device is configured to receive the first trick-mode command from a user, the user device further comprising a transmitter to send the first trick-mode command from the user device to the first network device.

12. The system of claim 8,
wherein the receiver of the first network device is configured to receive a video-on-demand (VOD) catalog from the remote network device and receive a selection form the user device of a piece of content by the user, and
wherein the transmitter of the first network device is configured to transmit the VOD catalog to the user device and to transmit the selection to the remote network device.

13. The system of claim 8,
wherein the transmitter is configured to retransmit the second media stream from the buffer of played content in response to receiving the rewind command without receiving the played content from the remote network device a second time; and
wherein the receiver is configured to receive the first media stream in the first network device from the remote network device using the first protocol while the transmitter simultaneously retransmits the second media stream from the buffer of played content.

14. A non-transient computer-readable medium including computer-executable instructions, the computer-executable instructions including:

instructions to receive content as a first media stream, in a first network device from a remote network device, using a first network protocol, wherein the first network protocol includes a MPEG-TS (Motion Picture Expert Group-Transport Stream) protocol;

instructions to convert the first media stream to a second media stream according to a second network protocol, wherein the second network protocol includes a DLNA (Digital Living Network Alliance) protocol;

instructions to transmit the content as the second media stream to a user device;

instructions to store the content transmitted as the second media stream in a buffer of played content in the first network device;

instructions to receive a first trick-mode command according to a first trick-mode protocol from the user device, wherein the first trick-mode command includes a rewind, a fast-forward, or a pause command, wherein the first trick-mode protocol includes a DLNA trick-mode protocol;

instructions to convert the first trick-mode command into a second trick-mode command according to a second trick-mode protocol different than the first trick-mode command, wherein the second trick-mode protocol includes a RTSP (Real Time Streaming Protocol) trick-mode protocol, and wherein the instructions to convert the first media stream include instructions to convert the first media stream in real-time;

instructions to transmit the second trick-mode command to the remote network device;

instructions to receive a rewind command according to the first trick-mode protocol from the user device;

instructions to retransmit the content, as the second media stream, from the buffer of played content in response to receiving the rewind command, to the user device;

instructions to continue to receive the content as the first media stream in the first network device from the remote network device, while simultaneously retransmitting the content, as the second media stream, from the buffer of played content to the user device;

instructions to store, in a buffer of unplayed content, the content received while simultaneously retransmitting the content, as the second media stream, from the buffer of played content;

instructions to receive a fast-forward command according to the first trick-mode protocol instructions to receive a fast-forward command according to the first trick-mode protocol from the user device;

instructions to transmit, in response to receiving the fast forward command, the content stored in the buffer of unplayed content as the second media stream;

instructions to determine when the buffer of unplayed content is close to empty while transmitting, in response to receiving the fat-forward command, the content stored in the buffer of unplayed content as the second media stream;

instructions to transmit a fast-forward command in the second trick-mode protocol to the remote network device when determined that the buffer of unplayed content is close to empty;

instructions to transmit the second media stream to the user device simultaneously with receiving the first media stream;

instructions to decrypt media in the first media stream from a first encrypted format; and instructions to re-encrypt the media into a second encrypted format, wherein the second media stream includes the re-encrypted media in the second encrypted format.

15. The computer-readable medium of claim 14, further comprising:
   instructions to receive the second media stream in the user device; and
   instructions to display media on a display in the user device based on the second media stream.

16. The computer-readable medium of claim 15, further comprising:
   instructions to receive the first trick-mode command from a user; and
   instructions to transmit the first trick-mode command from the user device to the first network device.

* * * * *